INVENTOR
Burton F. Latham, Jr.
BY L. David Trapnell
ATTORNEY

3,295,895
METHOD AND APPARATUS FOR PNEUMATICALLY CONVEYING FINELY DIVIDED SOLIDS
Burton F. Latham, Jr., Houston, Tex., assignor to Continental Carbon Company, Houston, Tex., a corporation of Delaware
Filed June 8, 1965, Ser. No. 462,328
7 Claims. (Cl. 302—17)

This invention relates to the pneumatic conveying of finely divided solids, and particularly to such solids as are sticky and tend to pack, bridge, and cake in storage vessels.

For a number of years, fluidized material, such as finely divided solids, slurries, etc., has been successfully transported by pneumatic conveying systems. Sometimes there is utilized an ejector comprising a rubber lined valve which can be so actuated as to constrict the valve opening and thereby effect a Venturi action which assists in the ejection of the material into the pneumatic conveying system itself.

Some particulate materials, such as aluminum hydride, absorb water and tend to cake in the throat of the Venturi-shaped ejector due to water loss at the reduced pressure within the throat.

It is among the objects of the invention to provide an improved pneumatic conveying system which is relatively simple and inexpensive to install, operate and maintain.

Another object is the provision of a system of the class described which utilizes an improved Venturi-shaped ejector.

Another object is the attainment of the foregoing advantages with a Venturi-shaped ejector which reduces to a minimum any tendency of the fluidized material to build up at the throat; means being provided for eliminating any packing, bridging or caking when it does occur.

Figure 1:
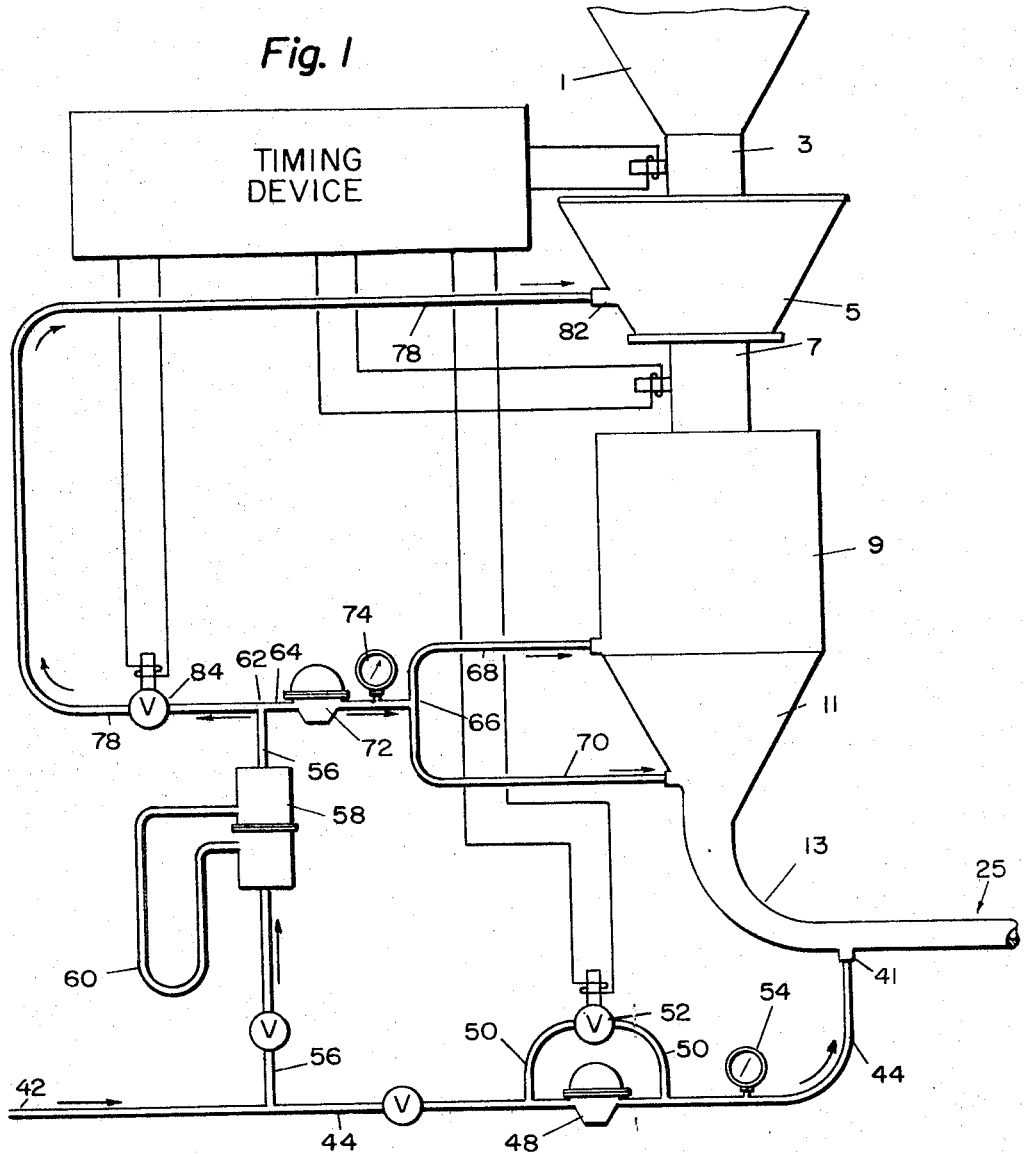
Figure 2:
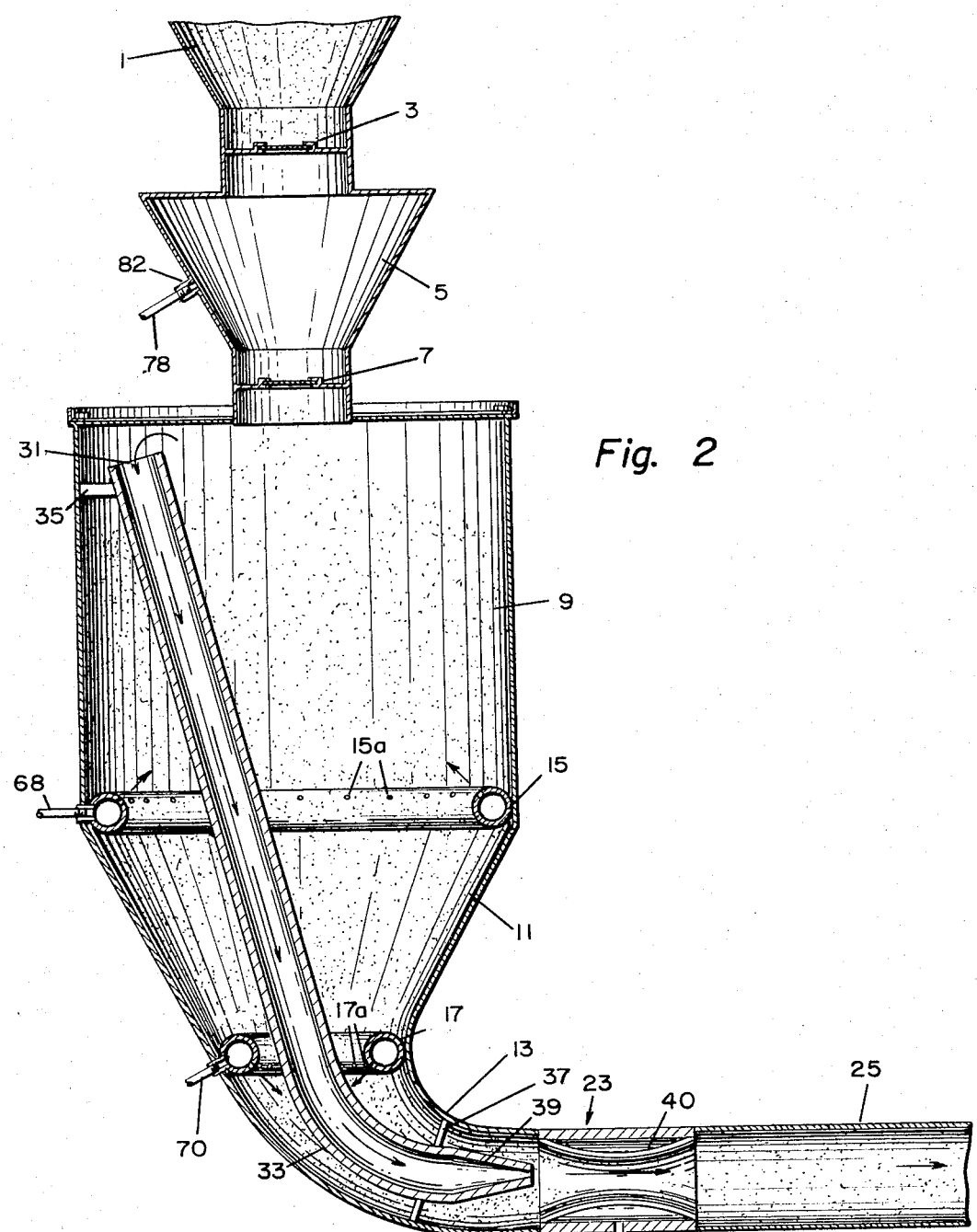

The foregoing and other objectives and features will best be understood and appreciated from the following description and annexed drawings in which like numerals designate like parts, and wherein:

FIGURE 1 is a diagrammatic layout of a typical embodiment of the novel apparatus; and FIGURE 2 is an enlarged elevational view, partly in section, of the aeration pressure vessel and its connected Venturi-shaped ejector.

Referring more particularly to the drawings, the numeral 1 designates the main storage hopper for the material to be pneumatically conveyed.

Disposed in the bottom of the main storage hopper 1 is a valve 3 which communicates through an intermediate pressure vessel 5 and a valve 7 with an aeration pressure vessel 9.

The main body portion of the aeration pressure vessel 9 is generally straight-sided, and its bottom portion 11 tapers and is connected to a curved reducing elbow 13. The outer end of this right-angularly-extending reducing elbow 13 connects with a tubular valve housing 23 which, in turn, communicates with the conduit 25 of the pneumatic conveyor through which the material is to be conveyed.

An upper aeration pipe ring 15 is disposed within the aeration pressure vessel 9 adjacent the bottom of its main straight-sided body portion; and a lower aeration pipe ring 17 is disposed within its lower tapering portion 11.

As shown in the drawings, the upper aeration pipe ring 15 is provided with a series of apertures 15a, whch are so disposed as to eject air upwardly at an angle of approximately 45° with respect to the horizontal; and the lower aeration pipe ring 17 of smaller diameter has a series of apertures 17a which are so positioned as to eject air at a downward angle of approximately 45°.

A pipe 31 with a straight upper portion and a curved lower end 33 is arranged to extend angularly from one side of the upper end of the straight-sided portion of the aeration pressure vessel 9, centrally through the bottom of the tapering lower portion 11 thereof, and curvilinearly through the central portion of the curved reducing elbow 13. The upper end of the pipe 31 is attached to a pipe support 35 and its curved lower end 33 is secured centrally within the curved reducing elbow by a spider 37.

The extremity of the curved lower end 33 of the pipe 31 is provided with a nozzle 39 which is axially disposed with respect to the aforementioned tubular valve housing 23.

The inner surface of the tubular valve housing 23 is Venturi-shaped, and disposed therewithin is a flexible lining 40 of rubber or other suitable material. A nipple 41 communicates with the space between the inner surface of the tubular valve housing 23 and the outer surface of the flexible lining 40. Accordingly, the supplying of air, or other suitable gas, to the nipple 41 at suitable pressures will result in the constriction of the flexible lining 40 to reduce the size of the throat of the Venturi it provides.

A suitable source of compressed air is generally designated at 42; and it communicates, through a compressed air line 44, with the nipple 41 on the tubular valve housing 23. This compressed air line contains a pressure regulator control 48 which is bridged with a by-pass line 50, the latter containing a remotely controlled solenoid valve 52. Disposed in the compressed air line 44 between the by-pass 50 and the nipple 41 on the tubular valve housing 23 is a pressure gage 54.

Connected to the compressed air line 44 adjacent the source of compressed air is a compressed air line 56 which contains an orifice flow meter 58 and a differential gage 60. This compressed air line 56 is connected to a T connection 62; and one outlet of the T connection 62 is connected to a compressed air line 64 which terminates in a T connection 66. The outlets of the T connection 66 are shown at 68 and 70 as communicating with the upper and lower aeration pipe rings 15 and 17, respectively. Intermediate its ends which communicate with the T connections 62 and 66, the compressed air line 64 contains a pressure regulator 72 and a pressure gage 74.

Connected to the other outlet of the T connection 62 is a compressed air line 78 which terminates at a nipple 82 which communicates with the interior of the main storage hopper 1. This compressed air line 78 contains a remotely controlled solenoid valve 84.

*Operation*

The valve 3 in the bottom of the main (atmospheric) storage hopper is controlled from a timer-solenoid system; and when it opens, it fills the intermediate pressure vessel 5 with the material to be pneumatically conveyed.

When the valve 3 shuts the intermediate pressure vessel 5 is pressurized with compressed air, opening the solenoid valve 84 (which again is controlled by the remote control timer) to a pressure somewhat higher than the operating pressure of the aeration pressure vessel 9–11.

At this point the valve 7, which is controlled from the timer-solenoid system, opens; thus blowing the material to be conveyed from the intermediate pressure tank 5 down into, and filling, the aerattion pressure vessel 9–11.

The valve 7 then closes and pressure is released from the intermediate pressure vessel 5 in any suitable manner, as by means of a solenoid vent valve in the top thereof.

The valve 3 again opens, again starting the filling cycle of the aerating tank. It is contemplated that this cycle is timed so as to constantly maintain the aeration pressure vessel at least one-half full of the material to be conveyed in the pneumatic pressure system.

The aeration air passes from the source of compressed air 42, compressed air line 56, pressure regulator 72, etc., into the aeration pipe rings 15 and 17, being discharged or ejected through the air discharge apertures 15a and 17a, respectively. The lower ring 17 directs part of the aerattion air downward and the upper ring 15 directs the remainder in an upward direction. Most of the aerating air finely bubbles upwardly to the top of the aeration pressure vessel, thus aerating or fluidizing the bed of material therein.

Next the aeration air enters the ejector nozzle inlet pipe 31, passing downwardly through it and its curved lower end 33 and being discharged through nozzle 39 into and through the flexible lining 40 in the tubular valve housing 23.

The high velocity compressed air stream being discharged from the nozzle 39 into the throat of the Venturi-shaped ejector creates a vacuum, and aspirates the fluidized material into the pneumatic conveyor conduit 25.

The flow of the fluidized material into the conveyor line is controlled by the throat opening of the Venturi-shaped ejector formed by the flexible valve liner 40 and the pressure carried within the aeration pressure vessel 9–11.

The diameter of the throat of the Venturi-shaped ejector 40 is controlled by the pressure regulator 48 which controls the pressure between the flexible lining and the tubular valve housing 23.

Increasing the pressure settings on the pressure regular 48 causes reduction in the diameter of the throat opening.

The largest flow of fluidized material is obtained at the highest pressure on the aeration vessel 9–11 and larger throat openings. More dense fluidized material to be conveyed, higher conveying rates, and longer pneumatic conveyors, all require increased pressure in the aeration vessel.

As stated earlier herein, materials which absorb water of hydration, such as aluminum hydride, tend to cake in the throat of the Venturi-shaped ejector nozzle (formed by the valve lining 40) due to water loss at the reduced pressure within the throat. However, the flexibility of the lining permits it to be flexed inwardly to thereby break loose all of the material which is packing, bridging or caking thereon. This is accomplished by the brief periodic opening of the solenoid valve 52 in the by-pass 50 through the operation of the remote control timer.

According to the foregoing construction and arrangement, the powdered material to be pneumatically conveyed is aerated by bubbling compressed air (or other suitable gas) upwardly through a fluid bed thereof which is contained within a pressurized aerating vessel normally operating at pressures between two to two hundred p.s.i.g. The fluidized solid material from the pressurized aerating vessel is aspirated while using the same aerating air (or other gas) for aspiration. The aspirated fluidized material is transmitted through the pipeline 25 of the pneumatic conveyor at relatively high concentration, having fluidized densities ranging from one-half to twenty pounds per cubic foot.

The focusing of the jet of fluidizing air at the axis of the throat of the Venturi-shaped ejector nozzle 23–40 results in the uniform contact thereof with the particles of material, thereby fluidizing the latter to a greater degree and giving a more uniform mixture.

Having thus described the invention, what is claimed as new and desired to be secured by Letters Patent is:

1. In a pneumatic conveying system
    a vessel for the material to be conveyed;
    said vessel having an outlet opening;
    a gas pipe disposed in said vessel and extending toward said outlet opening;
    means for supplying gas to said gas pipe;
    a nozzle connected to said gas pipe and disposed in substantially axial alignment with the outlet opening in said vessel hopper;
    a Venturi-shaped valve body communicating with said outlet opening and with the conduit of said pneumatic conveyor;
    a flexible lining disposed in said Venturi-shaped valve body and adapted for movement inwardly with respect thereto; and
    means for supplying gas under pressure to the interior of said valve body to move said flexible lining therefrom and constrict the throat of the Venturi-shaped opening provided thereby.

2. In a pneumatic conveying system as in claim 1, aerating means disposed in said vessel; and means for supplying gas to said aerating means.

3. In a pneumatic conveying system, a substantially vertically disposed pressure vessel for the material to be conveyed; said pressure vessel having an outlet opening in the bottom thereof; a gas pipe disposed in said pressure vessel; a Venturi-shaped valve body communicating with the outlet opening in said pressure vessel; a nozzle connected to said gas pipe and disposed in substantially axial alignment with said Venturi-shaped valve body; a flexible lining disposed in said Venturi-shaped valve body and adapted for movement inwardly toward the axis thereof; and means for supplying gas under pressure to the interior of said valve body to move said flexible lining therefrom and constrict the throat of the Venturi-shaped opening provided thereby.

4. In a pneumatic conveying system as in claim 3, aerating means disposed in said pressure vessel; and means for supplying gas to said aerating means.

5. In a pneumatic conveying system as in claim 3, a main storage hopper adapted to operate under pressure; means including a valve for providing communication between said main storage hopper and said pressure vessel; and means for supplying gas to the interior of said main storage hopper.

6. In a pneumatic conveying system, a substantially vertically disposed pressure vessel for the material to be conveyed; said pressure vessel having an outlet opening in the bottom thereof; an angular extension carried by said pressure vessel and communicating with the outlet opening in the bottom thereof; a Venturi-shaped valve body communicating with said angular extension; a gas pipe disposed in said pressure vessel; a nozzle connected to said gas pipe and disposed in substantially axial alignment with said Venturi-shaped valve body; a flexible lining disposed in said Venturi-shaped valve body and adapted for movement inwardly toward the axis thereof; and means for supplying gas under pressure to the interior of said valve body to move said flexible lining therefrom and constrict the throat of the Venturi-shaped opening provided thereby.

7. In a pneumatic conveying system, a substantially vertically disposed pressure vessel for the material to be conveyed; said pressure vessel having an outlet opening in the bottom thereof; an angular extension carried by said pressure vessel and communicating with the outlet opening in the bottom thereof; a Venturi-shaped valve body communicating with said angular extension; a gas pipe disposed in said pressure vessel; aerating means disposed in said pressure vessel; a nozzle connected to said gas pipe and disposed in substantially axial alignment with said Venturi-shaped valve body; a flexible lining disposed in said Venturi-shaped valve body and adapted for movement inwardly toward the axis thereof; means including a pressure regulator for supplying gas under pressure to said gas pipe; means including a pressure regulator for supplying gas under pressure to said aerating means; and means including a pressure regulator for supplying gas under pressure to the interior of said valve body to move said flexible lining therefrom and constrict the throat of the Venturi-shaped opening provided thereby; said last-named means including a remotely controlled by-pass.

References Cited by the Examiner

UNITED STATES PATENTS

| | | | |
|---|---|---|---|
| 1,566,517 | 12/1925 | Bergman | 302—53 |
| 2,391,484 | 12/1945 | Seymour | 302—64 |
| 2,587,188 | 2/1952 | McFadden | 138—45 |
| 3,121,593 | 2/1964 | McIlvaine | 302—53 |

ANDRES H. NIELSEN, *Primary Examiner.*